April 11, 1944.
W. KILCHENMANN
2,346,587
TWO-SHAFT OPPOSED-PISTON INTERNAL COMBUSTION ENGINE
Filed May 27, 1942
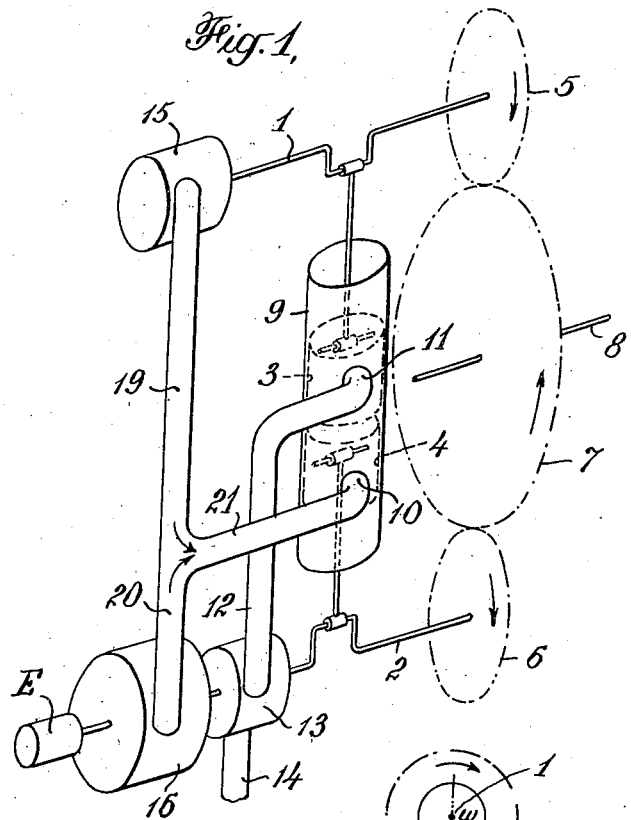
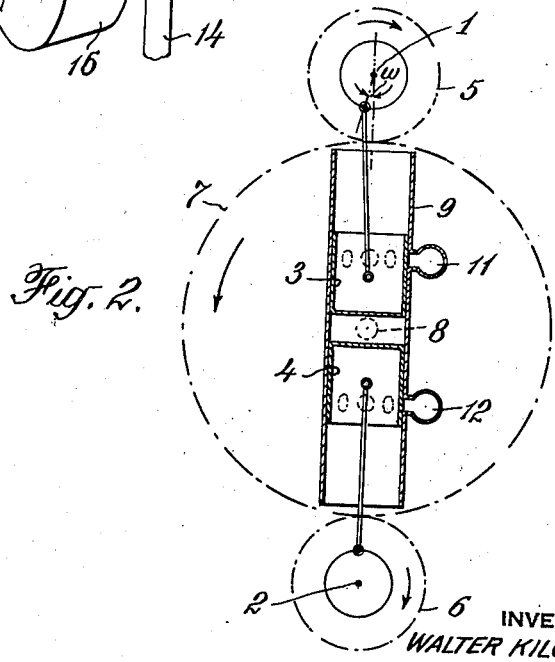
INVENTOR
WALTER KILCHENMANN
BY
ATTORNEYS Patented Apr. 11, 1944

2,346,587

UNITED STATES PATENT OFFICE 2,346,587

TWO-SHAFT OPPOSED-PISTON INTERNAL COMBUSTION ENGINE

Walter Kilchenmann, Winterthur, Switzerland, assignor to Sulzer Frères, Société Anonyme, Winterthur, Switzerland Application May 27, 1942, Serial No. 444,677
In Switzerland September 5, 1941

2 Claims. (Cl. 123—51)

The invention relates to a two-shaft opposed-piston internal combustion engine working on the two-stroke cycle, with its crankshaft driving the main shaft through a central gear. It consists in that the auxiliary equipment (charging compressor, pumps, exhaust gas turbines, etc.), coupled to the internal combustion engine and required for its service, are dimensioned and/or arranged in such a way that the powers transmitted from the two crankshafts of the internal combustion engine to the central gear are at least approximately equal, thus ensuring smoother running of the internal combustion engine.

In order to obtain equilibrium between the powers transmitted from the crankshafts to the central gear, the compressor for instance, which supplies the combustion air, can be divided in such a way that the necessary power required for driving it is obtained partly from one crankshaft and partly from the other crankshaft. The crankshaft on the inlet side of the engine may also be coupled to a turbine driven by the exhaust gas turbine, or the crankshaft on the exhaust side may be coupled to a compressor which supplies the combustion air.

The subject matter of the invention is illustrated diagrammatically in the drawing.

Fig. 1 shows one example of execution according to the invention,

Fig. 2 is a section through a second example of execution.

The crankshafts 1 and 2 (Figs. 1 and 2) are driven by pistons 3 and 4 respectively and transmit the power through the toothed wheels 5 and 6 respectively and the central gear wheel 7 to the main shaft 8, to which any kind of shaft (not shown) may be flanged, for instance the propelling shafting of a ship.

The working cylinder 9 (Fig. 1) is supplied through inlet 10 with the air required for combustion. Two compressors 15 and 16, which may for instance be designed as rotary compressors, are fitted direct on the crankshafts 1 and 2 respectively. They work in parallel, so that the compressed air from each of them can pass into the inlet pipe 21 through the pipes 19 and 20 respectively.

The combustion gases flow through the exhaust port 11 from the cylinder, then through a pipe 12 to the exhaust gas turbine 13, and finally from this turbine through pipe 14 to the atmosphere or to some further point of use, for instance a heat exchanger. The exhaust gas turbine 13 is coupled to the crankshaft 2 on the inlet side. A gear, not shown in the drawing, may be used to reduce the high speed of the exhaust gas turbine to the lower speed of the crankshaft.

The crankshafts 1 and 2 each receive power $L_3$ and $L_4$ respectively from the piston sets 3 and 4 respectively. In addition to that, the exhaust gas turbine 13 also transmits power $L_{13}$ to the crankshaft 2. The compressors 15 and 16 each require power $L_{15}$ and $L_{16}$ respectively from the crankshafts 1 and 2 respectively, and finally the auxiliary electric generator E also requires power $L_E$. The powers $L_1$ and $L_2$ transmitted to the central gear from the crankshafts 1 and 2 respectively must be approximately equal. Consequently $$L_1 = L_3 - L_{15} = L_2 = L_4 + L_{13} - L_{16} - L_E$$

Because equally great powers are transmitted to the central gear from the two crankshafts 1 and 2, the working of the engine is smooth and uniform, and the gear is kept from being damaged. The forces which are exerted on the gear from both sides are equally great, so that the forces acting on the bearings are to a large extent eliminated. In addition to that, the risk is diminished that the torque may fluctuate to such an extent that it becomes negative at certain times. In this way also, the intermeshing wheels of the central gear are prevented from causing noise.

The crankshaft 1 on the exhaust side of the engine, as shown in Fig. 2, has a certain lead with respect to the crankshaft 2 on the inlet side. When working with the sense of rotation shown in the drawing, each crank of the crankshaft 2 on the inlet side is exactly at its dead centre when the opposite crank of the crankshaft 1 on the outlet side has already passed the corresponding dead centre by the angle (which may be 5–10° for instance). In consequence of this lead, the power transmitted from piston 3 to the crankshaft 1 on the exhaust side is essentially greater than the power transmitted to the crankshaft 2 from the set of pistons 4 on the inlet side.

The difference between the powers transmitted in the two cases may be as much as 20% of the total power of the two crankshafts and even more. For equalising the powers transmitted from the two crankshafts 1 and 2, the compressor supplying the combustion air may be divided in such a way that one part is driven from the crankshaft 1 on the exhaust side and another part from the crankshaft 2 on the inlet side. The power required for driving these two compressors must then be such that the power still available in one crankshaft for transmitting to the central gear, is equal to the power available for the same purpose in the other crankshaft.

The internal combustion engine according to the invention may also have several cylinders arranged in rows. In the case of single-cylinder engines, or engines with a small number of cylinders, the uniformity given to the running is particularly advantageous, since with such engines there is an increased risk of the torque becoming negative at certain times.

As to the compressors, they may be of the reciprocating type or of any kind of the rotary type, for instance centrifugal compressors, axial compressors, rotary compressors or such like. The compressor will preferably be of such dimensions that at full load, or at the load at which the plant is generally worked, there will be as far as possible exact agreement between the amounts of power transmitted to the central gear from the two crankshafts. With smaller or greater loads, smaller differences in the amounts of power may occur in consequence of the change in the efficiencies.

I claim:

1. In a two-shaft opposed-piston two-stroke-cycle internal combustion engine with the two crankshafts connected through a central gear to a main shaft and the crankshaft of one engine arranged to lead the other crankshaft, the improvement which comprises a separate compressor driven by each crankshaft for supplying combustion air to the engine, and an exhaust gas turbine connected to and arranged to aid in driving the crankshaft which lags, said crankshaft which leads delivering more power than the crankshaft which lags but the compressors and exhaust gas turbine being so proportioned with respect to power input and output that the power delivered to the central gear by each crankshaft is substantially the same.

2. In a two-shaft opposed-piston two-stroke-cycle internal combustion engine with the two crankshafts connected through a central gear to a main shaft and the crankshaft of one engine arranged to lead the other crankshaft, the improvement which comprises a common cylinder for each pair of opposed pistons, means for introducing combustion gas into the cylinder at a place between the dead center positions of both pistons and the shaft which lags, means for exhausting gas from the cylinder at a place between the dead center of the pistons and the shaft which leads, a separate compressor driven by each crankshaft for conjointly supplying air to the cylinder, an exhaust gas turbine arranged to aid in driving the shaft which lags, and means for passing exhaust gas from the cylinder to the exhaust gas turbine, said crankshaft which leads delivering more power than the crankshaft which lags but the compressors and exhaust gas turbine being so proportioned with respect to power input and output that the power delivered to the central gear by each crankshaft is substantially the same.

WALTER KILCHENMANN.